United States Patent
Ogletree et al.

[19]

[11] Patent Number: 5,949,421
[45] Date of Patent: Sep. 7, 1999

[54] METHOD AND SYSTEM FOR EFFICIENT REGISTER SORTING FOR THREE DIMENSIONAL GRAPHICS

[75] Inventors: Thomas M. Ogletree, Austin; Mark Alan Einkauf, Leander, both of Tex.

[73] Assignee: Cirrus Logic, Inc., Fremont, Calif.

[21] Appl. No.: 08/828,528

[22] Filed: Mar. 31, 1997

[51] Int. Cl.[6] ................................................ G09G 1/16
[52] U.S. Cl. ............................................................ 345/419
[58] Field of Search ................................... 345/418, 419, 345/421, 422

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |

FOREIGN PATENT DOCUMENTS

WO 96/36011  11/1996  WIPO.

*Primary Examiner*—Phu K. Nguyen
*Assistant Examiner*—Cliff N. Vo
*Attorney, Agent, or Firm*—Wagner, Murabito & Hao; Steven A. Shaw

[57] ABSTRACT

A polygon vertex sorting circuit for a three dimensional graphics computer system. The system of the present invention includes a swap configuration circuit coupled to receive a plurality of vertex address corresponding to a plurality of vertices of a polygon. The swap configuration circuit is coupled to an address input bus to receive the plurality of vertex addresses. An address output interface circuit is coupled to the swap configuration circuit. The address output interface circuit interfaces the output of the swap configuration circuit with an address output bus. A control circuit is coupled to the swap configuration circuit and the output interface circuit. The control circuit sorts the plurality of vertices by configuring the swap configuration circuit and the address output interface circuit to output a swapped vertex address via the address output bus in response to receiving one of the plurality of vertex addresses via the address input bus.

17 Claims, 10 Drawing Sheets

METHOD AND SYSTEM FOR EFFICIENT REGISTER SORTING FOR THREE DIMENSIONAL GRAPHICS

FIELD OF THE INVENTION

The present invention pertains to the field of computer controlled graphic display systems. More particularly, the present invention relates to a method and system for efficiently sorting a plurality of registers which store information representative of vertices of a 3 dimensional object.

BACKGROUND OF THE INVENTION

Computer graphics are being used today to perform a wide variety of tasks. Many different areas of business, industry, government, education, entertainment, and most recently, the home, are tapping into the enormous and rapidly growing list of applications developed for today's increasingly powerful computer devices. Graphical user interfaces have replaced textual interfaces as the standard means for user computer interaction and 3 dimensional (3D) graphics applications are widely used to visually present graphic objects to the user.

In a 3D computer generated image, objects are typically described by data models. These models store descriptions of graphics "primitives" (e.g., polygons, lines, points, etc.) that define the shape of the object, the object attributes, and the connectivity and positioning of how the objects fit together. The polygons connect at common edges defined in terms of common vertices and enclosed volumes. The polygons are textured, Z-buffered, and shaded/illustrated onto an array of pixels, creating a realistic 3D image. Until recently, real time user interaction with 3D models and pseudo-realistic images was generally performed on very high performance workstations. These workstations contain dedicated, special purpose graphics hardware, and are typically very expensive. The progress of semiconductor fabrication technology has made it possible to do real time 3D animation, with color shaded images of complex objects, described by thousands of polygons, on relatively inexpensive rendering subsystems.

Figure 1:
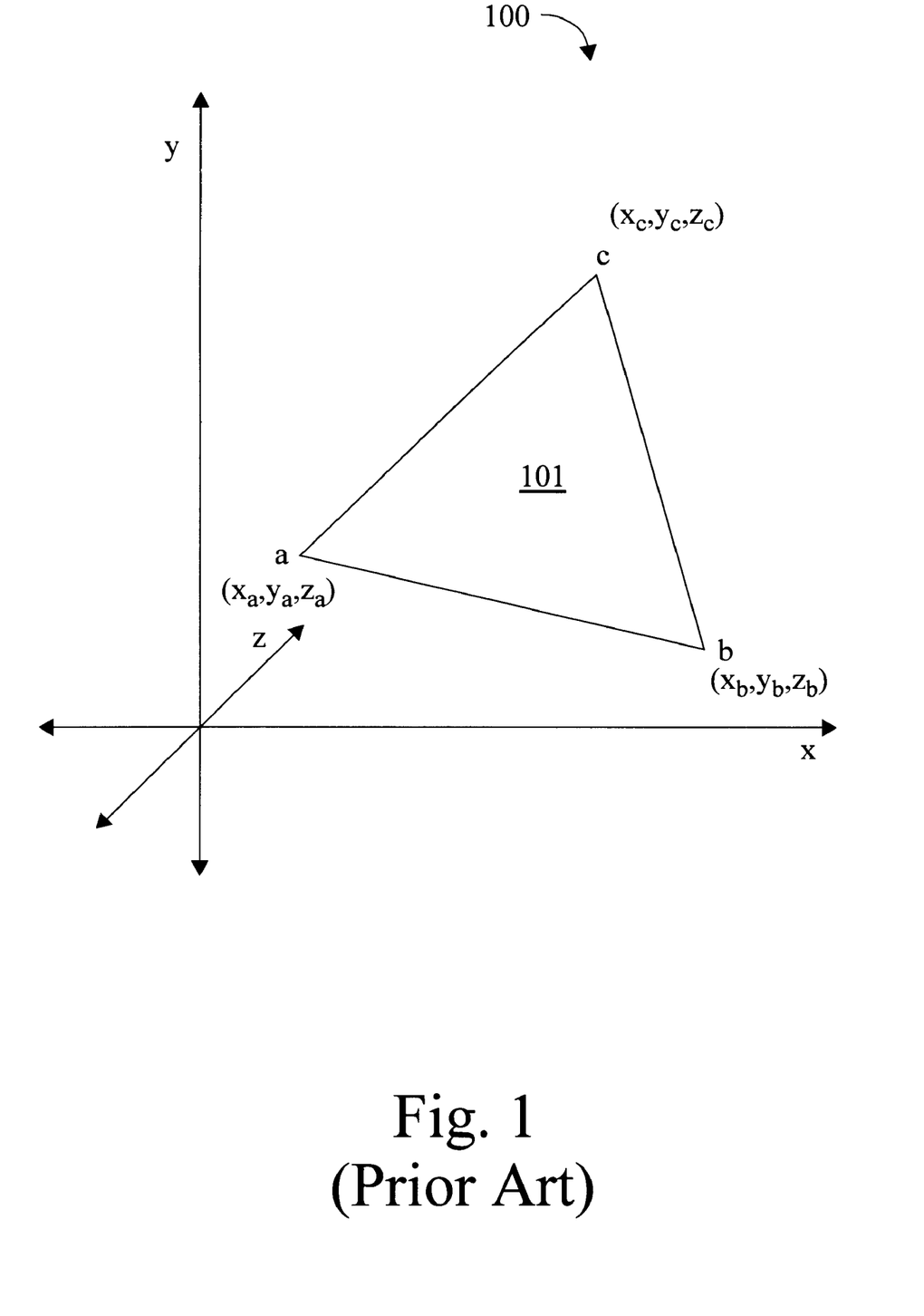
FIG. 1 shows a diagram of a graphics primitive polygon from a 3D graphical object.

Referring now to prior art FIG. 1, a diagram 100 of a polygon 101 from a 3D object is shown. Polygon 101 is one of a number of polygons comprising a 3D object (not shown) and is oriented in 3D space as shown by the x, y, and z axis. Polygon 101 is a triangle polygon defined by three vertices a, b, and c. Each of the vertices a, b, and c are located in 3D space by their respective x, y, and z coordinates. Polygon 101 is stored in a computer readable memory by storing the attributes of each defining vertex a, b, and c. As is well known in the art, each vertex includes, in addition to the x, y, and z coordinates, "argb" (transparency, red, green, blue), "s" (specular highlight), "w" (perspective), and "u" and "v" (texel coordinates). Hence, each of vertices a, b, and c typically includes eight pieces of information, x, y, z, a, w, u, and v. Each of these pieces of information are stored as a 32 bit data word in the memory of a computer system.

Polygon 101 is rendered by a special 3D graphics rendering pipeline implemented on the computer system. The graphics rendering pipeline includes dedicated, special purpose graphics hardware (e.g., integrated circuits optimized for geometry transformation, specialized graphics rendering integrated circuits, and the like) to speed the rendering process. For efficiency, the logic comprising these integrated circuits is implemented in fast integrated circuit hardware. This hardware is optimized to process the vertices comprising a polygon from "top to bottom." Thus, prior to passing the vertices a, b, and c to the graphics pipeline, they are sorted based upon their respective y attributes such that polygon 101 is passed to the graphics rendering pipeline as vertex c, vertex a, and vertex b. In this manner, rendering of an object proceeds from top to bottom.

There are generally two widely used methods of sorting polygon vertices. The first method is software based sorting. In software based sorting, the vertices a, b, and c are stored in a memory of a computer system in an arbitrary order (e.g., typically the order in which the vertices a, b, and c were defined by a 3D graphics application). The vertices a, b, and c are subsequently sorted through software based indirect addressing using a sorted address map. The address map points to the vertices a, b, and c in such a manner that they are sorted from top to bottom (e.g., c, a, b). References to the vertices a, b, and c are thus actually references to the pointers of the sorted address map.

Software based sorting, however, is very inefficient. As described above, each reference to a data word of a vertex (e.g., vertex a) is actually a reference to the sorted address map. Each reference requires that a pointer to the data word be fetched prior to fetching the data word itself. Thus, references to any of vertices a, b, or c would consume at least two clock cycles as opposed to one.

The second method of sorting polygon vertices is called physical location based sorting. In physical location based sorting, the vertices a, b, and c are initially stored in the memory of the computer system in an arbitrary order, as described above. The vertices a, b, and c are subsequently sorted by physically swapping the vertices among locations in the memory. Hence, in the case of vertices a, b, and c, if the vertices are initially stored in the order of a, b, and c, vertex c and vertex b are physically swapped such that the order becomes c, a, b. Each subsequent reference to a data word of the vertex (e.g., vertex a) consumes only one clock cycle.

Physical location based sorting, however, requires the movement of large amounts of data. For example, to swap vertex b and c, vertex b is transferred to a temporary memory location, vertex c is transferred to the memory location previously occupied by vertex b, and vertex b is transferred from the temporary memory location to the memory location previously occupied by vertex c. As described above, each of vertices a, b, and c includes 8 attributes and consumes a total of 8 data words. Hence, swapping vertex b and c consumes 24 clock cycles. Where a 3D object contains a large number of vertices, statistics dictate on average approximately 20 clock cycles per triangle polygon are consumed swapping vertices (e.g., a percentage of these triangle polygons are in the correct order initially).

Thus, what is required is a graphics display system which sorts the vertices of polygons with respect to a polygon attribute which allows references to the vertices to occur in one clock cycle. What is needed is a solution that does not consume a large number of clock cycles sorting vertices through physically moving them around in memory. Additionally, what is needed is a solution that interfaces seamlessly with existing specialized graphics rendering integrated circuits and enhances the efficiency of the graphics rendering process. The present invention provides such an advantageous solution.

SUMMARY OF THE INVENTION

The present invention includes a polygon vertex sorting circuit for a 3 dimensional graphics computer system. The system of the present invention sorts the vertices of polygons with respect to a polygon attribute such that references to the vertices to occur in one clock cycle in a computer system. The present invention does not consume a large number of clock cycles sorting vertices by physically moving them around in memory. In addition, the system of the present invention interfaces seamlessly with existing specialized graphics rendering integrated circuits and enhance the efficiency of the graphics rendering process.

The system of the present invention includes a swap configuration circuit coupled to receive a plurality of vertex address corresponding to a plurality of vertices of a polygon. The swap configuration circuit is coupled to an address input bus to receive the plurality of vertex addresses. An address output interface circuit is coupled to the swap configuration circuit. The address output interface circuit interfaces the output of the swap configuration circuit with an address output bus. A control circuit is coupled to the swap configuration circuit and the output interface circuit. The control circuit sorts the plurality of vertices by configuring the swap configuration circuit and the address output interface circuit to output a swapped vertex address via the address output bus in response to receiving one of the plurality of vertex addresses via the address input bus.

BRIEF DESCRIPTION OF THE DRAWINGS

The present invention is illustrated by way of example and not by way of limitation, in the figures of the accompanying drawings and in which like reference numerals refer to similar elements and in which.

Prior art

DETAILED DESCRIPTION OF THE INVENTION

In the following detailed description of the present invention, a method and system for efficient register sorting for 3D graphics, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "sorting" or "transferring" or "processing" or "rendering" or "storing" or "swapping" or "outputting" or the like, refer to the action and processes of a computer system (e.g., computer system 900 of FIG. 9), or similar electronic computing device, that manipulates and transforms data represented as physical (electronic) quantities within the computer system's registers and memories into other data similarly represented as physical quantities within the computer system memories or registers or other such information storage, transmission or display devices.

Brief Overview of the Present Invention

The present invention comprises a polygon vertex sorting circuit for a three dimensional computer controlled graphics display system. The system of the present invention sorts the vertices of polygons with respect to a polygon attribute such that references to the vertices to occur in one clock cycle in a computer system. In the present embodiment, the vertices are sorted by their respective "y" attribute such that they are accessed in a top to bottom manner.

To increase responsiveness to the user and overall 3D rendering speed, the present invention does not consume a large number of clock cycles sorting vertices by physically moving them around in memory. Rather, the system of the present invention manipulates the addresses of the vertices to provide the appearance of having moved the vertices around in memory, greatly reducing bus transfer bandwidth requirements. In addition, the system of the present invention allows accesses to the vertices to occur in a single clock cycle. These, and other benefits allow the present invention to interface seamlessly with existing specialized graphics rendering integrated circuits and enhances the efficiency of the graphics rendering process.

The system of the present invention includes a swap configuration circuit coupled to receive the addresses corresponding to the vertices of a polygon. The swap configuration circuit is coupled to an address input bus and receives the address of the vertices via the address input bus. An address output interface circuit is coupled to the swap configuration circuit. The address output interface circuit functions by interfacing the output of the swap configuration circuit with an address output bus. The system of the present invention also includes a control circuit coupled to the swap configuration circuit and the output interface circuit. The control circuit manages the vertex sorting process by configuring the swap configuration circuit and the address output interface circuit and controlling the process of outputting swapped vertex addresses. Vertex addresses are received via address input bus, swapped in the swap configuration circuit, and interfaced with the address output bus by the output interface circuit. The benefits, characteristics, and circuitry of the present invention are discussed in detail below.

Detailed Discussion of the System of the Present Invention

Figure 2:
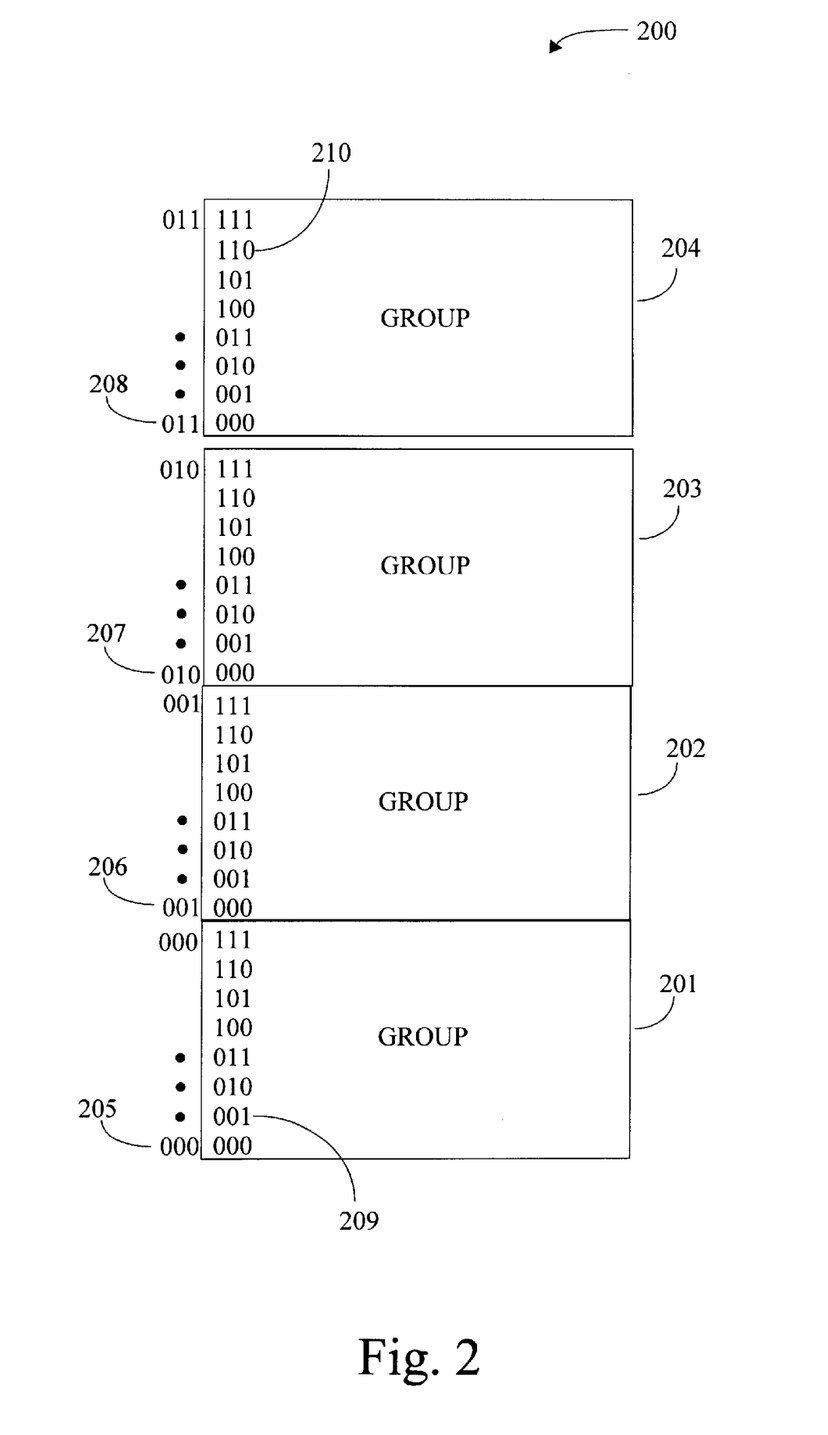
FIG. 2 shows a block diagram of a portion of a register file in accordance with one embodiment of the present invention.
Figure 9:
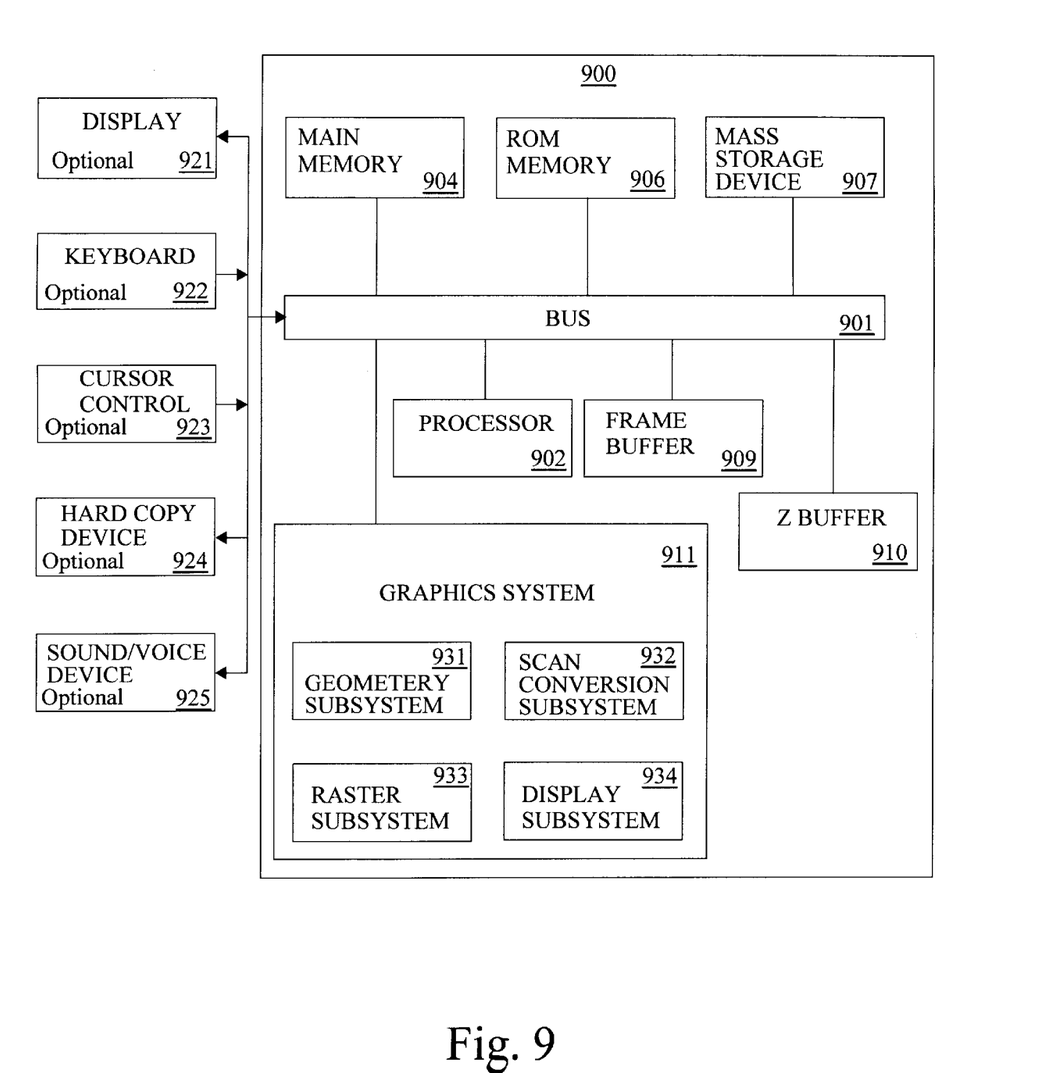
FIG. 9 shows an exemplary computer controlled graphics display system in which the present invention is practiced.

FIG. 2 shows a block diagram of a portion of a register file 200 in accordance with one embodiment of the present invention. Register file 200 resides in a memory of a computer system (FIG. 9). Register file 200 comprises a file of linearly addressed registers. Register file 200 includes group 201, group 202, group 203, and group 204 (hereafter groups 201–204). Each of groups 201–204 includes eight registers (numbered binary 000 through 111) in one implementation. In the present embodiment, each of groups 201–204 has a starting address 205, 206, 207, and 208, on 8 register boundaries (e.g., addresses 000, 001, 010, 011). The starting address can be offset by multiples of eight. For example, in the present embodiment, the base address (e.g., starting address 205) is 010000000 binary. Group 202 begins with starting address 206 (e.g., 010001000), group 203 begins with starting address 207 (e.g., 010010000), and group 204 begins with starting address 208 (e.g., 010011000).

Each of groups 201–204 comprises 8 contiguous registers (e.g., binary 000 through 111). Thus register file 200 is essentially a large file of linearly addressed registers used for storing vertex attributes. For storage efficiency, the registers of register file 200 are loaded such that contiguous registers store attributes for a single vertex. Hence, in the case of eight data words per vertex, each group of groups 201–204 store attributes of a single vertex (e.g., vertex 201), one data word per register. Each register in register file 200 (e.g., register 209) is addressed and accessed independently via its own unique address. For example, bit 3, bit 4, and bit 5 of the address of each data word in group 201 matches bits 3, 4, and 5 (hereafter bits 3–5) of the group address 205. Thus, for example, the last 6 bits of the address of register 209 are 000001 while the last 6 bits of register 210 are 011110. In this manner, bits 3–5 of group 202 registers are 001 and bits 3–5 of group 203 registers are 010.

Figure 3A:
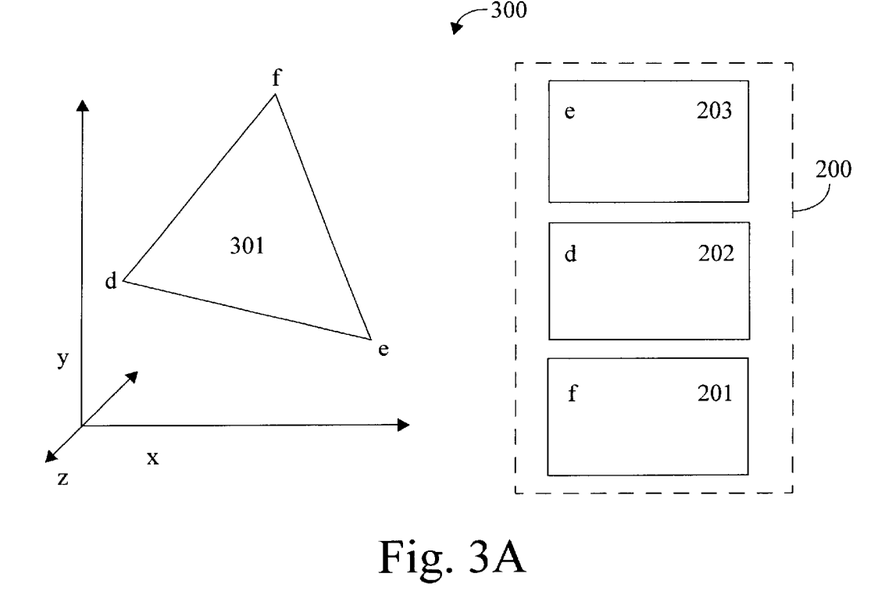
FIG. 3A shows a diagram of the process of the present invention.

FIG. 3A shows a diagram of the process 300 of the present invention. Polygon 301 is defined by vertices d, e, and f. As described above, each of vertices d, e, and f include eight attributes, one data word per attribute. As the vertices d, e, and f are defined and used by a 3D software application, they are arbitrarily accessed from memory 904 (FIG. 9) and stored in register file 200. Vertex f is stored in group 201, vertex d is stored in group 202, and vertex e is stored in group 203. The vertices d, e, and f, however, need to be sorted according to their respective y coordinate attributes because this is the format in which the special purpose hardware rendering circuitry 931 (FIG. 9) expects to receive them.

Figure 3B:
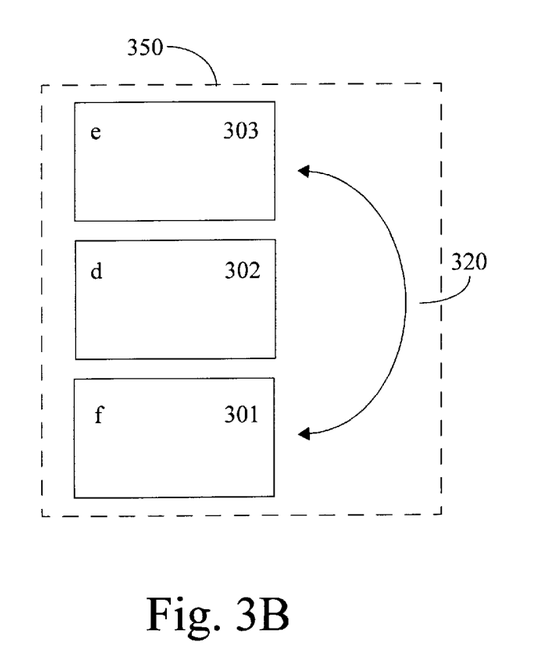
FIG. 3B shows a swap map in accordance with the present invention.

FIG. 3B shows a swap map 350 in accordance with the present invention. The system of the invention creates swap map 350 in order to sort the vertices d, e, and f. The groups 201, 202, and 203 are referenced via their respective addresses. Block 301 represents addresses of group 201, block 302 represents addresses of group 202, and block 303 represents addresses of group 203. The present invention sorts vertices d, e, and f by swapping their addresses in the swap map 350, as represented by line 320.

Figure 3C:
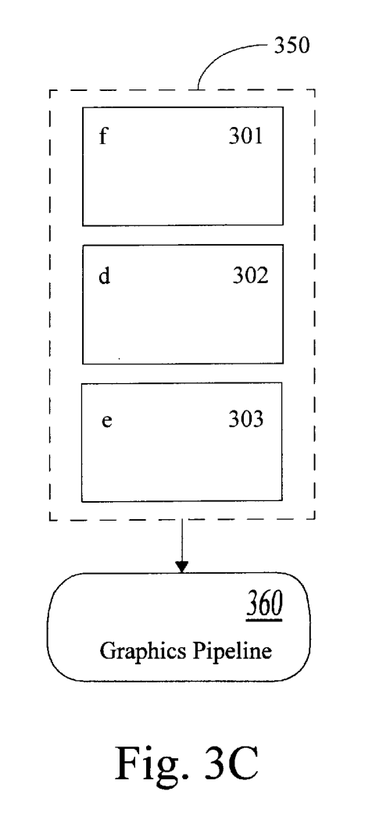
FIG. 3C shows swap map from FIG. 3B after a swap operation.

FIG. 3C shows swap map 350 after the swap 320. The addresses of the vertices d, e, and f are sorted such that, by using counter techniques, a graphics pipeline 360 accesses each of vertices d, e, and f in the required top to bottom manner. Accesses to each attribute (e.g., data word) require only a single clock cycle. In this manner, the vertices d, e, and f appear to be physically sorted in register file 200. However, only the addresses of the vertices d, e, and f (as represented by blocks 301, 302, and 303) have been physically sorted in swap map 350. The physical location of vertices d, e, and f in register file 200 remain unchanged. Groups 201, 202, and 203 remain at the same physical addresses in register file 200. The process of the present invention is transparent to graphics pipeline 360. The special purpose graphics hardware of graphics pipeline 360 accesses vertices d, e, and f as if they were physically sorted in register file 200.

Thus, the present invention does not require the movement of large amounts of data. The vertices d, e, and f are sorted by swapping vertex addresses of the map 350. A prior art physical location based sort, in comparison, consumes an average of 20 clock cycles per polygon moving data words while the system of the present invention accomplishes the same task in a single clock cycle. Likewise, a prior art software based sort, in comparison, requires two clock cycles per reference to each data word while the system of the present invention accomplishes data word references in a single clock cycle. Swap map 350 maps references to vertices d, e, and f in a transparent manner.

Figure 4:
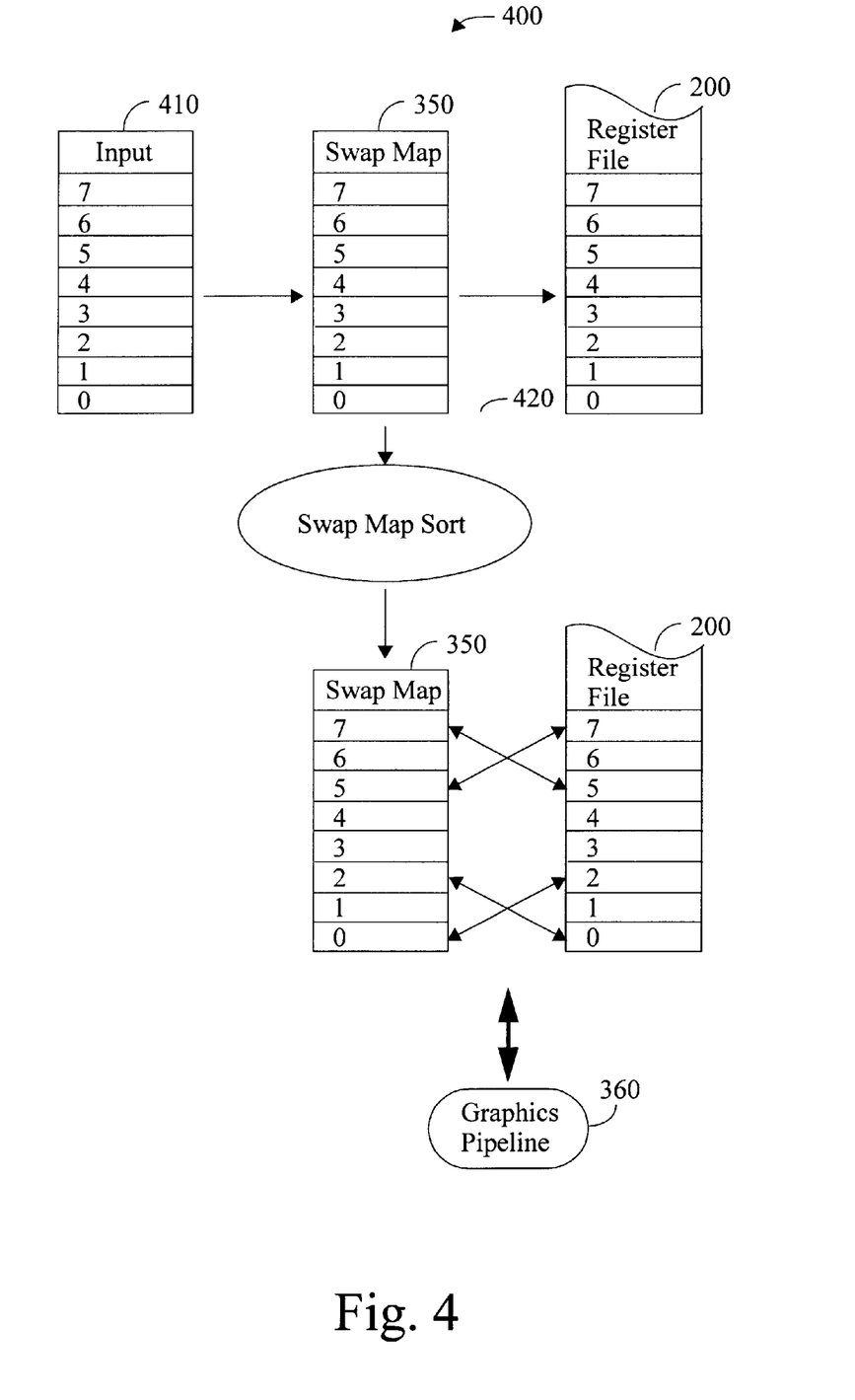
FIG. 4 shows a diagram of the swap map to register file relationship of the present invention in greater detail.

With reference now to FIG. 4, a diagram 400 of the swap map to register file relationship of the present invention is shown in greater detail. Diagram 400 shows an input represented by block 410. Input 410 includes eight vertices (numbered 0–7) from a 3D software application. Input 410 is received by swap map 350 and register file 200 in an arbitrary order. In the present embodiment, swap map 350 has eight 3-bit entries (numbered 0–7) and the first eight groups (numbered 0–7) of register file 200 are shown. As described in the discussion of FIG. 2, where each vertex includes 8 data words, bits 3, 4, and 5 of the address of each data word correspond to the address of the vertex, which in turn, corresponds to the address of the group in which the vertex is stored. Each entry represents the address of the corresponding group. Hence, initially after input 410, bits 3, 4, and 5 of each entry in swap map 350 (e.g., entries 301, 302, and 303) match bits 3, 4, and 5 of the corresponding group in register file 200 (e.g., groups 201, 202, and 203).

The system of the present invention subsequently sorts the vertices from input 410 by sorting the entries in swap map 350, as represented by swap map sort 420. A software configuration program swaps the entries such that they are physically sorted within swap map 350. In the example above, entry 303 is swapped with entry 301 as described above. Hence, after the swap map sort 420, the entries in swap map 350 proceed contiguously from top to bottom and map to the appropriate corresponding group. although the physical location of groups 201, 202 and 203 in register file 200 remain unchanged. Graphics pipeline 360 accesses groups 201, 202, and 203 as if they were physically sorted in register file 200.

Figure 5A:
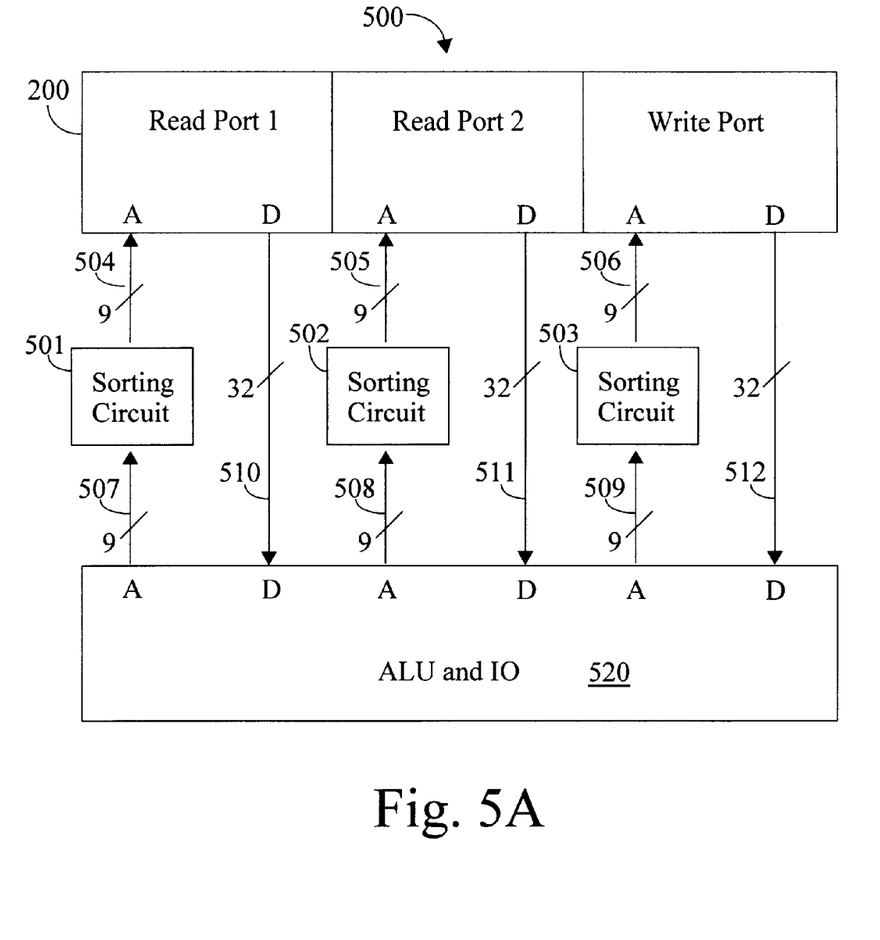
FIG. 5A shows a diagram of register hardware of a computer system in accordance with one embodiment of the present invention.

FIG. 5A shows a diagram 500 of register hardware of computer system 900 in accordance with one embodiment of the present invention. In the present embodiment, register file 200 comprises a triple ported 512×32 register array. Register file 200 includes two read ports, read port 1 and read port 2, and a single write port. Read port 1, read port 2, and the write port each have a 32-bit address bus input "A" and a 32-bit data bus output "D". Sorting circuit 501, sorting circuit 502, and sorting circuit 503 are each vertex sorting circuits in accordance with the present invention. The address output busses 504, 505, and 506 respectively coupling sorting circuits 501, 502, and 503 to register file 200. The address input busses 507, 508, and 509 respectively couple sorting circuits 501, 502, and 503 to the ALU (arithmetic logic unit) and IO (input output) hardware 520. The ALU and IO hardware 520 includes address bus outputs "A" and data bus inputs "D". The register file 200 is coupled to ALU and IO hardware 520 via a data bus 510, a data bus 511, and a data bus 512. ALU and IO hardware 520 comprise a portion of graphics pipeline 360 from FIG. 3C and FIG. 4.

Referring still to FIG. 5A, the sorting circuits 501, 502, and 503 each receive data word addresses from the ALU and IO hardware 620 via the address input busses 507, 508, and 509. In sorting circuits 501, 502, and 503, the addresses are sorted and mapped in the manner described above. The sorting circuits 501, 502, and 503 subsequently output mapped data word addresses to register file 200 via the address output busses 504, 505, and 506. The data word corresponding to the mapped data word address is output from the register file 200 via data busses 510, 511, and 512. The ALU and IO hardware 520 receive the data word corresponding to the mapped data word address as if the data word corresponded to the data word address issued via address input busses 507, 508, and 509. It should be noted that the data word address is issued by the ALU and IO hardware and the data word corresponding to the mapped data word address is received by the ALU an IO hardware 520 in a single clock cycle.

Figure 5B:
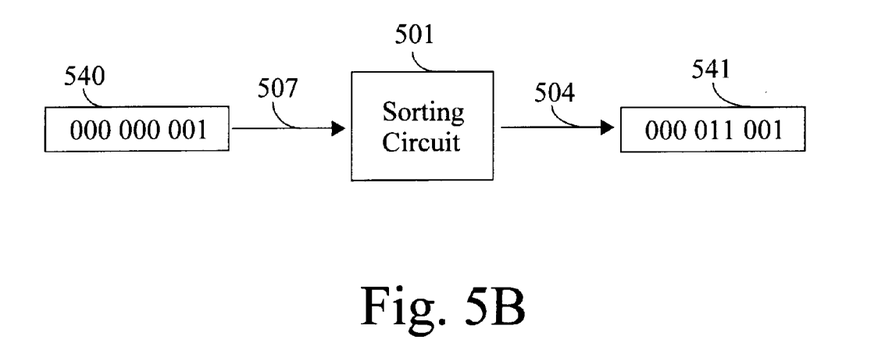
FIG. 5B shows a sorting circuit in accordance with one embodiment of the present invention.

With reference now to FIG. 5B, the sorting circuit 501 in accordance with one embodiment of the present invention is shown. Sorting circuit 501 is coupled to a data word address 540 via address input bus 507. As described above, sorting circuit 540 maps data word address 540 into a mapped data word address 541. The mapped data word address 541 is output via address output bus 504. Thus, sorting circuit 501 is coupled between the address bus output of the ALU and IO hardware 520 (FIG. 5A) and the address bus input of register file 200. Data word addresses corresponding to swapped data words (e.g., data word address 540) are intercepted by sorting circuit 501 of the present invention and mapped to swapped data word addresses (e.g., swapped data word address 541).

It should be noted that sorting circuit 501 intercepts and maps bits 3, 4, and 5 of data word address 540 with mapped data word address 541, swapping the 8 contiguous registers of group "000" with the eight contiguous registers of group "011". As shown in FIG. 5B, sorting circuit 540 swaps groups comprised 8 registers per group. It should be appreciated, however, that the present invention is easily configured to operate on groups comprised of 4 contiguous registers, 2 contiguous registers, or even a single register. Accordingly, to swap groups comprised of 4 contiguous registers, sorting circuit 501 of the present invention intercepts bits 2, 3, and 4. To swaps groups comprised of 2 contiguous registers, sorting circuit 501 intercepts bits 1, 2, and 3. Likewise, to swap groups comprised of a single register, sorting circuit intercepts bits 0, 1, and 2. For efficiency, the present invention operates on along the binary boundaries of the data word addresses (e.g., 1, 2, 4, or 8 registers per group corresponding to the 3 address bits being intercepted).

Figure 6:
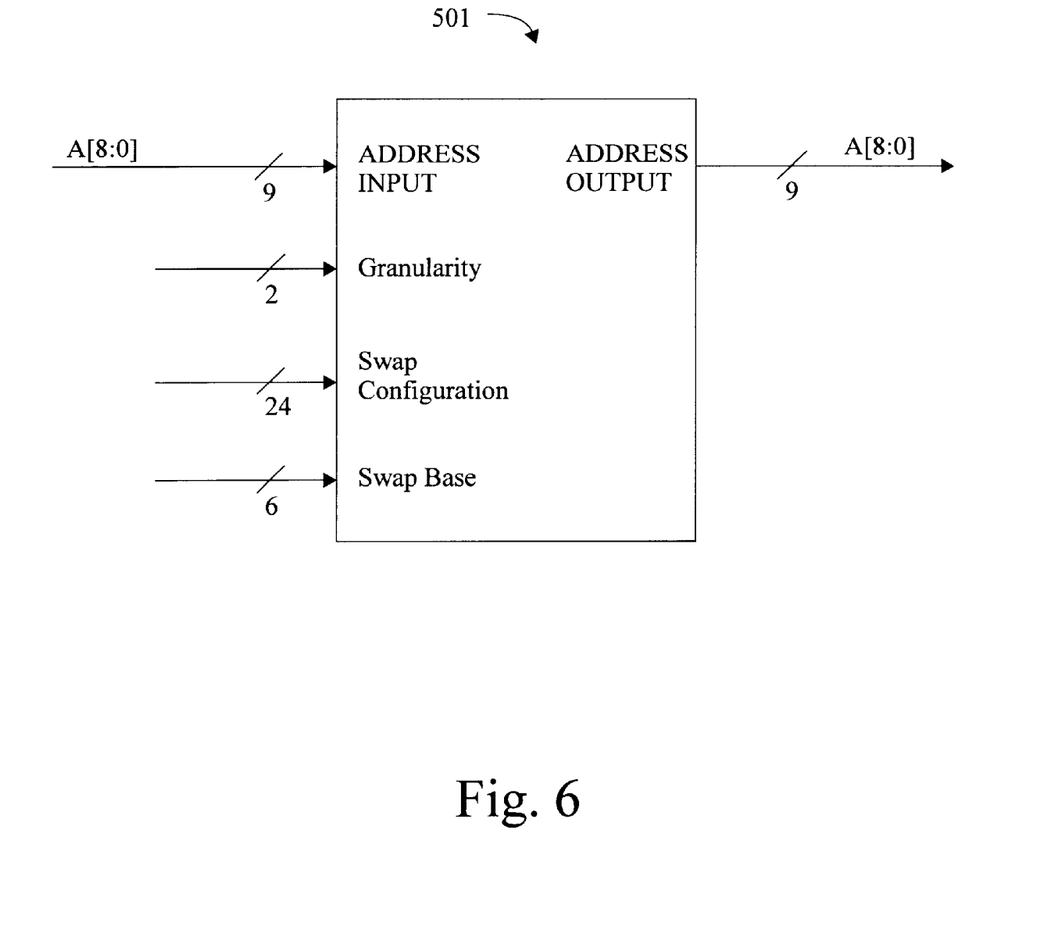
FIG. 6 shows a block diagram of the logical inputs and outputs of the sorting circuit from FIG. 5B.

FIG. 6 shows a block diagram of the logical inputs and outputs of sorting circuit 501. Sorting circuit 501 receives address lines A[8:0] (address line 8 through address line 0) from address input bus 507 (shown in FIG. 5A) as address inputs. Sorting circuit 501 receives a 2 bit granularity input, a 24 bit swap configuration input, and a 6 bit swap base input from data bus 510. Sorting circuit 501 outputs address lines A[8:0] as address outputs. Depending upon the configuration of sorting circuit 501, differing bits of A[8:0] are reconfigured to form the 9-bit A[8:0] signal coupled to address output bus 504 (shown in FIG. 5A) signal. This process is further described in the discussion of FIG. 7A and FIG. 7B below.

The granularity input configures sorting circuit 501 for the appropriate group size (e.g., groups comprised of 1, 2, 4, or 8 registers as described above). The granularity input also determines which bits of a data word address will be intercepted. The swap map base input determines the base address in the file register from which the swapping will occur. Thus, for example, where the granularity is 8 registers per group, swapping in accordance with the present invention takes place within a range extending up 64 registers from the base address. The address output is comprised of bits 3, 4, and 5 for an 8 register group, 2, 3, and 4 for a 4 register group, 1, 2, and 3 for a two register group, or 0, 1, and 2 for a group comprised of a single register, depending upon the granularity input. Differing combinations of address bits from A[8:3] and A[0:2] are added to these address in the manner described above. The granularity input and the swap map base input are each initially set by a software configuration program. As described above, this software configuration program also initially sorts swap map 350 (FIG. 4).

Figure 7A:
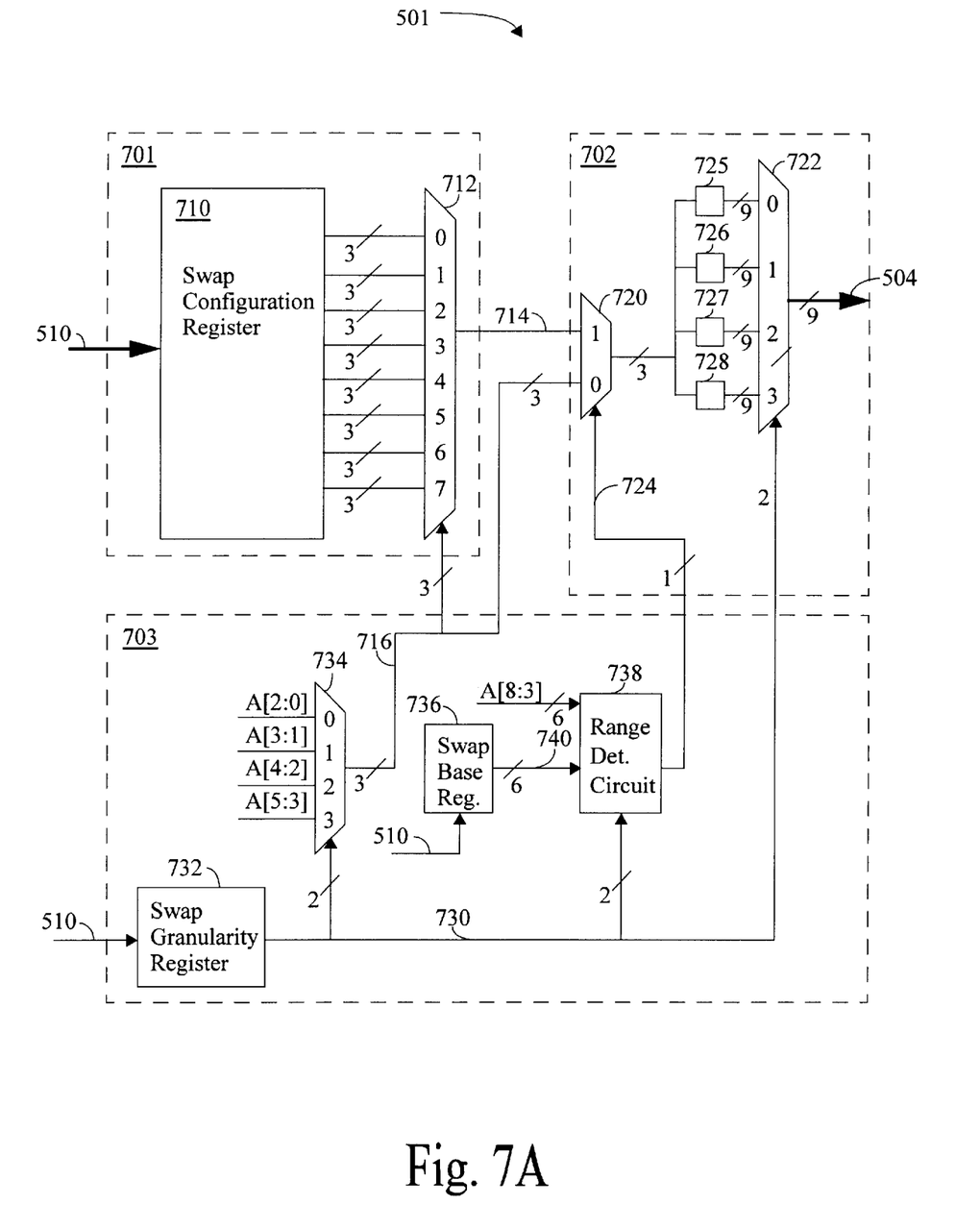
FIG. 7A shows a schematic circuit diagram of a sorting circuit in accordance with one embodiment of the present invention.

FIG. 7A shows a schematic circuit diagram of sorting circuit 501 in accordance with one embodiment of the present invention. Sorting circuit includes a swap configuration circuit 701, address output interface circuit 702, and control circuit 703. The swap configuration circuit 701 is coupled to address input bus 507 to receive data word addresses. The address output interface circuit 702 is coupled to address output bus 504 to output mapped data word addresses. The address output interface circuit is coupled to swap configuration circuit 701 to interface the output of swap configuration circuit 701 with address output bus 504. The control circuit 703 is coupled to both the swap configuration circuit 701 and the address output interface circuit 702. The control circuit 703 configures swap configuration circuit 701 and address output interface circuit 702 to sort the vertices received by sorting circuit 501 via data bus 510.

The swap configuration circuit 701 of FIG. 7A includes a swap configuration register 710 coupled to an eight input multiplexer 712. In the present embodiment, the swap configuration register 710 is a 3×8 register and stores eight 3-bit entries. The eight entries comprise swap map 350 (shown in FIG. 4). Each entry stored in swap configuration register 710 is individually coupled to a respective input (numbered 0–7) of multiplexer 712. Swap configuration register 710 is coupled to data bus 510 to receive eight 3-bit combinations of swap configuration data. Multiplexer 710 selectively couples one of the eight entries stored in swap configuration register 710 to the address output interface circuit 702 via line 714. Multiplexer 710 is controlled by the controller circuit 703 via bus 716.

The output interface circuit 702 of FIG. 7A includes a two input multiplexer 720 and a 4 input multiplexer 722. One input of multiplexer 720 is coupled to receive the output of the swap configuration circuit via line 714. The second input of multiplexer 720 is coupled to the controller circuit 703 via line 716. Multiplexer 720 is controlled by control circuit 703 via line 724. The output of multiplexer 720 is coupled to each of the four inputs of multiplexer 722 via interface circuit 725, interface circuit 726, interface circuit 727, and interface circuit 728 respectively (hereafter interface circuits 725–728).

The interface circuits 725–728 of FIG. 7A each combine differing combinations of address bits 3–8 and address bits 0–2 to the 3-bit output received from multiplexer 720 to form respective 9-bit outputs. Interface circuit 725 combines A[8:3] with the 3-bit output of multiplexer 720 such that the output of multiplexer 720 comprises A[2:0]. Interface circuit 726 combines A[8:4] and A[0] with the 3-bit output of multiplexer 720 such that the output of multiplexer 720 comprises A[3:1]. Interface circuit 727 combines A[8:5] and A[1:0] with the 3-bit output of multiplexer 720 such that the output of multiplexer 720 comprises A[4:2]. Similarly, interface circuit 728 combines A[8:6] and A[2:0] with the 3-bit output of multiplexer 720 such that the output of multiplexer 720 comprises A[5:3].

Each respective 9-bit output of interface circuits 725–728 is coupled to an input of multiplexer 722. Multiplexer 722 selectively couples one of the 9-bit outputs of interface circuits 725–728 to address output bus 504. Multiplexer 722 is controlled by control circuit 703 via line 730.

Control circuit 703 configures sorting circuit 501 for operation and manages the sorting process of swap configuration circuit 701 and address output interface circuit 702. Control circuit 703 includes a swap granularity register 732, a four input multiplexer 734, a swap base register 736, and a range determination circuit 738.

The swap granularity register 732 of FIG. 7A receives a granularity input, as described in the discussion of FIG. 6, which determines the number of registers per group the sorting circuit 501 will work with. The granularity input is a two bit number received from the software configuration program. The output of swap granularity register 732 is coupled to multiplexer 734, range determination circuit 738, and multiplexer 722 of the output interface circuit 702.

The swap base register 736 stores the swap map base. As described in the discussion of FIG. 6, the swap map base determines the base address in the file register 200 from which swapping will occur. The range determination circuit 738 is coupled to swap base register 736 to receive the swap map base via line 740. The range determination circuit 738 is also coupled to address lines A[8:3] from address input bus 507 (shown in FIG. 5A). Using A[8:3] from the address input bus and the swap granularity register output via line 730, range determination circuit 730 determines whether a data word address received via address input bus 507 is within the range of sorting circuit 501, as configured. For example, if sorting circuit 501 is configured for eight registers per group by swap granularity register 732, the range of sorting circuit 501 extends from the base address up 64 registers (e.g., 8 multiplied by the number of registers per group). The output of the range determination circuit is coupled to line 724 and controls multiplexer 720 of address output interface circuit 702.

The multiplexer 734 has four inputs (numbered 0–3), each respectively coupled to from address input bus 507. Multiplexer 734 selectively couples A[2:0], A[3:1], A[4:2], or A[5:3] to the number 1 input of multiplexer 720. Multiplexer 734 is controlled by the output of the swap granularity register via line 730.

The sorting circuit 501 of the present invention typically operates on vertices having eight data words per vertex. Hence, the granularity input in swap granularity register 732 is set for groups having eight registers per group by the software configuration program. It should be appreciated, however, that the sorting circuit 501 of the present invention is easily configured to operate on groups having four, two, or one register per group by appropriately adjusting the granularity input stored in swap granularity register 732. For operation with groups having eight registers, the output of swap granularity register 732 controls multiplexer 734 via line 730 and selects A[5:3] (bits 3–5 from address input bus 507). The multiplexer 734 subsequently couples A[5:3] to input 0 of multiplexer 720.

The swap base register 736 is loaded with the swap map base input via data bus 510 as the granularity input is loaded in swap granularity register 732, also via data bus 510. The swap map base input is coupled to range determination circuit 738 along with A[8:3] from address input bus 507. The range determination circuit 738 determines whether an address of a data word received via address input bus 507 is within range. The output of range determination circuit 738 controls multiplexer 720 via line 724. In this manner, multiplexer 720 selects A[5:3] when the address of the data word is out of range, and selects the output of swap configuration circuit 701 via line 714 when the address of the data word is within range.

In the present embodiment, the swap configuration register 710 stores eight 3-bit entries from data words received via data bus 510. The eight entries of swap configuration register 710 comprise swap map 350 (shown in FIG. 4). Thus, where granularity is eight registers per group, swap configuration register 710 stores bits 3–5 of eight contiguous groups. These groups, as described above, correspond to vertices, and are arbitrarily stored. The software configuration program subsequently sorts the eight entries such that they are physically sorted within swap configuration register 710, and hence, swap map 350 (shown in FIG. 4) and swap configuration circuit 701 is ready for operation.

When a data word address is subsequently received by multiplexer 734, A[5:3] from the output of multiplexer 734 controls multiplexer 712 and selects the corresponding one of the eight entries of swap configuration register 710. Since the eight entries of swap configuration register 710 have been sorted, A[5:3] selects its respective sorted entry. In this manner, the present invention swaps the 3 bits of A[5:3] with its respective sorted entry. This sorted entry is coupled via line 714 to input zero of multiplexer 720 as the output of swap configuration circuit 701. As described above, if the data word address is within range, the output of swap configuration circuit 701 is selected by multiplexer 720 and coupled to each of the interface circuits 725–728.

Figure 7B:
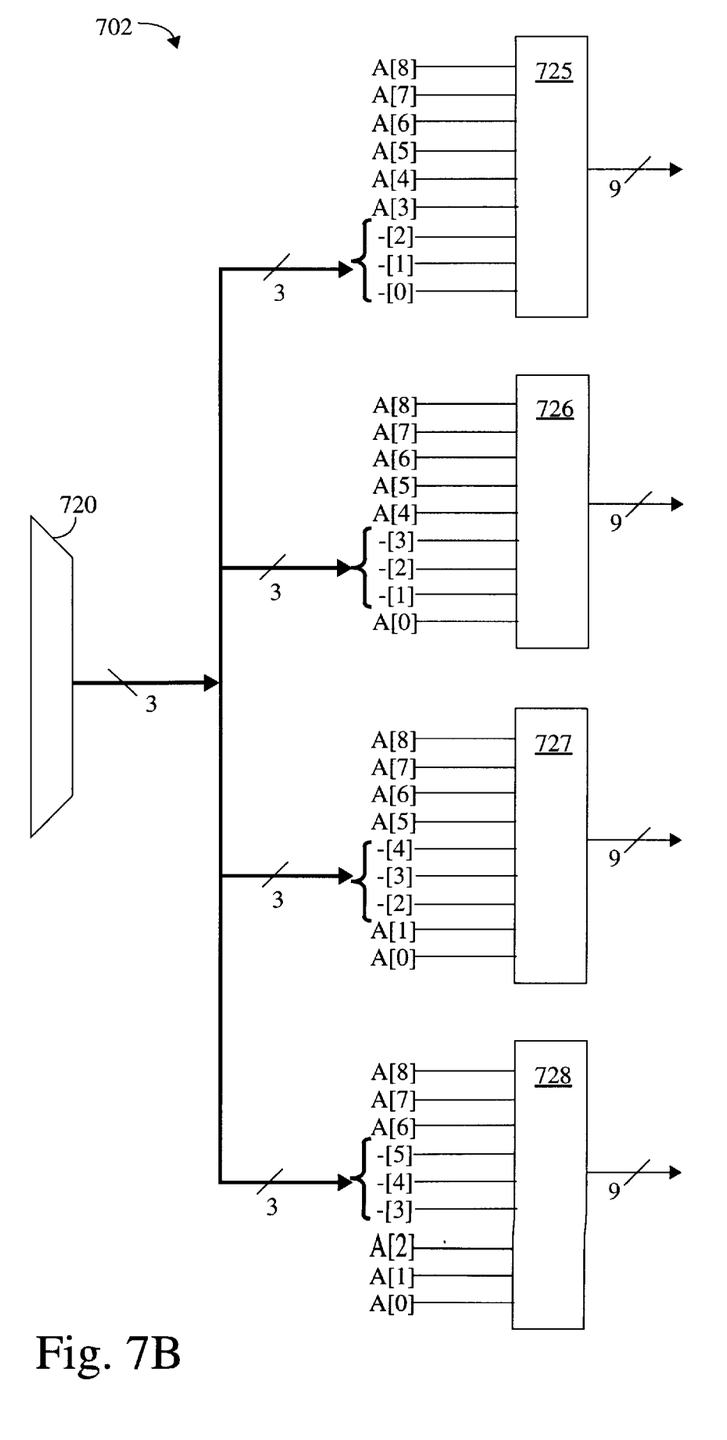
FIG. 7B shows the interface circuits from FIG. 7A in greater detail.

With reference now to FIG. 7B, the interface circuits 725–728 are shown in greater detail. The interface circuits 725 and 728 each combine differing combinations of address bits 3–8 and address bits 0–2 to the 3 bit output received from multiplexer 720, as described above. For example, the output of swap granularity register 732 controls multiplexer 722 and selects the output of interface circuit 728 (shown in FIG. 7A). Interface circuit 728 combines A[8:6] and A[2:0]

with the 3-bit output of multiplexer 720 such that the output of multiplexer 720 comprises A[5:3]. This resulting 9-bit output is coupled to address output bus 504 (shown in FIG. 7A) as a mapped data word address and this mapped data word address is subsequently received by register file 200, as shown in FIG. 5A.

If the data word address received via address input bus 507 is out of range, as described above, multiplexer 720 selects A[5:3] from multiplexer 734, [5:3] is combined (e.g., bit wise concatenated) with A[8:6] and A[2:0] to form A[8:0] in interface circuit 728, and A[8:0] is subsequently coupled to address output bus 504 by multiplexer 722. In this manner, received data word address which are out of range are "passed through" the sorting circuit 501 of the present invention.

It should be noted that the sorting circuit 501 of the present invention typically operates on vertices having eight data words per vertex. Hence, the granularity input in swap granularity register 732 is set for groups having eight registers per group by the software configuration program. It should be appreciated, however, that the sorting circuit 501 of the present invention is easily configured to operate on groups having four, two, or one register per group by appropriately adjusting the granularity input stored in swap granularity register 732. For operation with groups having eight registers, the output of swap granularity register 732 controls multiplexer 734 via line 730 and selects A[5:3] (bits 3-5 from address input bus 507). The multiplexer 734 subsequently couples A[5:3] to input 0 of multiplexer 720.

It should be appreciated that in addition to sorting vertices as described above, the sorting circuit 501 is well suited for use as a vertex cache storing eight vertices. These vertices are stored as entries in swap configuration register 710. Since sorting circuit is coupled directly between ALU and IO hardware 520 and file register 200, the eight vertices stored in swap configuration register 710 are more readily accessed than vertices stored in memory. In addition, since vertices are typically operated on three at a time (for triangle polygons), swap configuration register 710 can be used as a vertex cache (e.g., storing four vertices) while swapping the three vertices. The three vertices are referred to as "active vertices" and are moved to the lowest 3 entries of swap configuration register 710, while the remaining four entries are used as a vertex cache.

Figure 8:
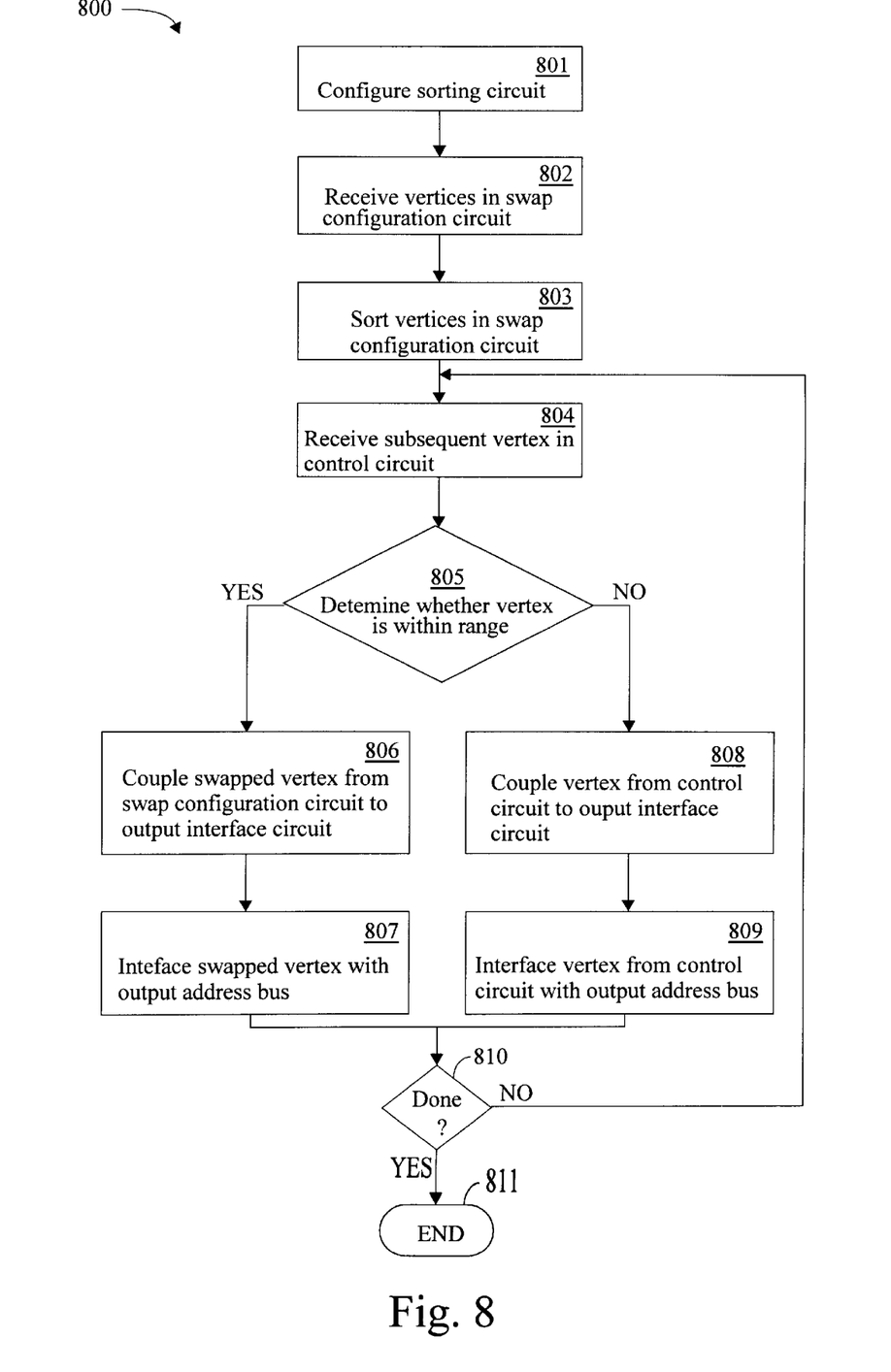
FIG. 8 shows a flow chart of the steps of a process in accordance with one embodiment of the present invention.

With reference now to FIG. 8, a flow chart of the steps of the process 800 in accordance with one embodiment of the present invention is shown. In step 801, sorting circuit 501 is configured by a software configuration program. The software configuration program configures the swap granularity by loading the swap granularity input into the swap granularity register 732. The swap map base is configured by loading the swap map base input into the swap map base register 736. The swap granularity input essentially indicates the number of vertex attributes stored per vertex and the swap base input essentially determines the base vertex address of the range in which vertex swapping will occur, as described above.

In step 802, the sorting circuit 501 receives vertices as they are arbitrarily generated and stored into register file 200. The swap configuration register 710 stores the vertex addresses in the order they are stored in register file 200. In step 803, the vertices are sorted within swap configuration circuit 701. The addresses of the vertices are sorted within the swap configuration register 710, in the manner described above, such that they are physically sorted. In step 804, a subsequent vertex (e.g., a data word address corresponding to an attribute) is received by control circuit 703 via address input bus 507. In step 805, the control circuit 703 determines whether this vertex is within range, as described above. If the vertex is within range, process 800 proceeds to step 806. If the vertex is not within range, process 800 proceeds to step 808.

In step 806 of FIG. 8, where the vertex is determined to be within range, a swapped vertex from swap configuration circuit 701 is coupled to interface circuits 725–728 of output interface circuit 702. In step 807, interface circuits 725–728 and multiplexer 722 of output interface circuit 702 interface the swapped vertex with address output bus 504, in the manner described above. Process 800 subsequently proceeds to step 810. In step 810, sorting circuit 501 returns to step 804 if more vertices are received. Process subsequently ends in step 811.

In step 808, where the vertex is determined to be out of range, the vertex received by control circuit 703 in step 804 is coupled to interface circuits 725–728 of output interface circuit 702. In step 809, interface circuits 725–728 and multiplexer 722 of output interface circuit 702 interface the vertex received by control circuit 703 with address output bus 504, in the manner described above. Process 800 subsequently proceeds to step 810 and step 811.

Thus, the polygon vertex sorting circuit of the present invention sorts the vertices of polygons with respect to a polygon attribute such that references to the vertices to occur in one clock cycle in a computer system. The present invention does not consume a large number of clock cycles sorting vertices by physically moving them around in memory. In addition, the system of the present invention interfaces seamlessly with existing specialized graphics rendering integrated circuits and enhance the efficiency of the graphics rendering process.

FIG. 9 shows a computer controlled graphics display system 900 in which the present invention is practiced. Computer system 900 includes a bus 901 for transmitting digital information between the various parts of the computer system. One or more microprocessors 902 are coupled to bus 901 for processing information. The information along with the instructions of how the information is to be processed are stored in a hierarchical memory system comprised of mass storage device 907, read only memory 906, main volatile memory 904, and static random access memory (SRAM) 903. Mass storage device 907 is used to store vast amounts of digital data. The mass storage device 907 can consist one or more hard disk drives, floppy disk drives, optical disk drives, tape drives, CD ROM drives, or any number of other types of storage devices having media for storing data digitally. A read only memory (ROM) 906 is used to store digital data of a permanent basis, such as instructions for the microprocessors. Main memory 904 is used for storing digital data on an intermediate basis. Main memory 904 can be dynamic random access memory (DRAM).

A 3D graphics system 911 is included in system 900. Graphics system 911 includes graphics pipeline 360 shown in FIG. 3C and FIG. 4. Processor 902 provides the graphics system 911 with graphics data, such as drawing Commands, coordinate vertex data, and other data related to an object's geometric position, color, texture, shading, and other surface parameters. The object data is processed by graphics system 911 in the following four pipelined stages: geometry subsystem 931, scan conversion subsystem 932, raster subsystem 933, and a display subsystem 934. The geometry subsystem 931 converts the graphical data from processor 902 into a screen coordinate system. It is the function of the geometry subsystem 931 to perform the projection and transformation process to give depth to a displayed object. The resulting primitives (points, lines, polygons, polyhedra, and the like) supplied by the geometry subsystem 931 are then supplied to the scan conversion subsystem 932. It is the function of the scan conversion subsystem 932 to then generate pixel data based on these primitives. The scan conversion subsystem 932 performs the interpolation functions to interpolate straight lines so that each intermediate value need not be individually and separately calculated by the geometry subsystem. Next, the pixel data is sent to the raster subsystem 933, whereupon Z-buffering, blending, texturing, and antialiasing functions are performed. The resulting pixel values are subsequently stored in frame buffer 909, and the Z values are stored in the Z buffer 910. The display subsystem 934 reads the frame buffer 909 and displays the image on monitor 921.

Several other devices may also be coupled to system 900. For example, an alphanumeric keyboard 922 is used for inputting commands and other information to processor 902. Another type of user input device is cursor control device 923 (a mouse, trackball, joystick, and the like) used for positioning a movable cursor and selecting objects on a computer screen. Another device which may be coupled to bus 901 is a hard copy device 924 (e.g., a laser printer) for printing data or other information onto a tangible medium. Additionally, a sound recording or video option 925 can be coupled to the system 900 to provide multimedia capabilities.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A polygon vertex sorting circuit for sorting vertices of graphics primitives into a proper order for processing in a three dimensional graphics computer system, comprising:

a swap configuration circuit coupled to receive a plurality of vertex addresses corresponding to a plurality of vertices via an address input bus;

an address output interface circuit coupled to said swap configuration circuit to interface an output from said swap configuration circuit with an address output bus; and a control circuit coupled to said swap configuration circuit and said address output interface circuit to sort said plurality of vertices by configuring said swap configuration circuit and said address output interface circuit to output a swapped vertex address via said address output bus in response to receiving one of said plurality of vertex addresses via said address input bus.

2. The circuit of claim 1 wherein said swap configuration circuit further comprises: a swap configuration register coupled to said address input bus, said swap configuration register for storing said plurality of vertex addresses such that said plurality of vertex addresses can be sorted by a configuration program; and a first multiplexer coupled to said swap configuration register for selecting one of said plurality of vertex addresses, said first multiplexer controlled by said control circuit, said first multiplexer for outputting said selected one vertex address as a swap configuration circuit output.

3. The circuit of claim 2 wherein said swap configuration circuit further comprises:

said swap configuration register having a plurality of entries for storing said plurality of vertex addresses, said plurality of vertex addresses sorted by physically sorting said plurality of vertex addresses in said entries of said swap configuration register, each of said plurality of entries coupled to said first multiplexer; and said first multiplexer for selecting one of said plurality of entries and outputting said selected one entry as said swap configuration circuit output.

4. The circuit of claim 2 wherein said output interface circuit further comprises: a second multiplexer coupled to receive said swap configuration circuit output from said first multiplexer, said second multiplexer coupled to receive a subsequent vertex address from said control circuit, said second multiplexer controlled by said control circuit, said second multiplexer for outputting said swap configuration circuit output or said subsequent vertex address as a second multiplexer output;

a plurality of interface circuits coupled to receive said second multiplexer output, each of said plurality of interface circuits for interfacing said second multiplexer output with said output address bus; and a third multiplexer coupled to each of said plurality of interface circuits, said third multiplexer for coupling an output of one of said plurality of interface circuits to said address output bus.

5. The circuit of claim 1 wherein said control circuit further comprises:

a swap granularity register for outputting a granularity output;

a fourth multiplexer coupled to said swap granularity register and to said address input bus, said fourth multiplexer controlled by said granularity output, said fourth multiplexer for receiving a subsequent vertex address and outputting said subsequent vertex address corresponding to said granularity output; and a range determination circuit for outputting a range signal, said range signal coupled to control said output interface circuit, said range determination circuit coupled to receive said granularity output from said swap granularity register.

6. The circuit of claim 5 wherein said control circuit further includes:

a swap base register for storing a swap base address;

said range determination circuit coupled to receive said swap base address from said swap base register and said subsequent vertex address via said address input bus, said range determination circuit for determining said range signal using said swap base address and said subsequent vertex address; and said swap granularity register for configuring said output interface circuit by coupling said granularity output to said output interface circuit.

7. A polygon vertex sorting circuit for a three dimensional graphics computer system, comprising:

a swap configuration register coupled to receive a plurality of data word addresses corresponding to a plurality of vertices via an address input bus, said swap configuration register for storing said plurality of data word addresses such that said plurality of data word addresses are sorted;

a first multiplexer coupled to said swap configuration register for selecting one of said plurality of data word addresses, said first multiplexer for outputting one of said plurality of data word addresses as a swap configuration register output;

an address output interface circuit coupled to said first multiplexer to interface an output from said swap configuration register with an address output bus; and a control circuit coupled to said first multiplexer and said address output interface circuit to sort said plurality of data words by controlling said first multiplexer and configuring said output address interface circuit to output a swapped data word address via said address output bus in response to receiving one of said plurality of data word addresses via said address input bus.

8. The circuit of claim 7, further comprising:

said swap configuration register having a plurality of entries for storing said plurality of data word addresses, said plurality of data word addresses sorted by a configuration program by physically sorting said plurality of data word addresses in said entries of said swap configuration register, each of said plurality of entries coupled to said first multiplexer; and said first multiplexer for selecting one of said plurality of entries and outputting said selected one entry to said output interface circuit as a swap configuration register output.

9. The circuit of claim 8 wherein said swap configuration register stores a cached data word addresses in at least one of said plurality of entries for access by a computer system.

10. The circuit of claim 8 wherein said output interface circuit further comprises:

a second multiplexer coupled to receive said swap configuration register output from said first multiplexer, said second multiplexer coupled to receive one of said plurality of data word addresses from said control circuit, said second multiplexer controlled by said control circuit, said second multiplexer for outputting said swap configuration register output or said one of said plurality of data word addresses as a second multiplexer output;

a plurality of interface circuits coupled to receive said second multiplexer output, each of said plurality of interface circuits for interfacing said second multiplexer output with said address output bus; and a third multiplexer coupled to each of said plurality of interface circuits, said third multiplexer for coupling an output of one of said plurality of interface circuits to said address output bus.

11. The circuit of claim 10 wherein said output interface circuit further comprises said third multiplexer for selecting an output of one of said plurality of interface circuits such that said selected one interface circuit output corresponds to a granularity output from said control circuit.

12. The circuit of claim 7 wherein said control circuit further comprises:

a swap granularity register for outputting a granularity output;

a fourth multiplexer coupled to said swap granularity register and to said address input bus, said fourth multiplexer controlled by said granularity output, said fourth multiplexer for receiving one of said plurality of data word addresses and outputting said one of said plurality of data word addresses corresponding to said granularity output; and a range determination circuit for outputting a range signal, said range signal coupled to control said output interface circuit, said range determination circuit coupled to receive said granularity output from said swap granularity register.

13. The circuit of claim 12 wherein said control circuit further includes:

a swap base register for storing a swap base address;

said range determination circuit coupled to receive said swap base address from said swap base register and said one of said plurality of data word addresses via said address input bus, said range determination circuit for determining said range signal using said swap base address and said one of said plurality of data word addresses; and said swap granularity register for configuring said output interface circuit by coupling said granularity output to said output interface circuit.

14. The circuit of claim 13 wherein said swap configuration register, said swap base register, and said swap granularity register are configured by a software configuration program.

15. In a polygon vertex sorting circuit coupled to a three dimensional graphics computer system, a method of sorting a plurality of vertices, the method comprising the steps of:

a) receiving a plurality of vertices in a swap configuration circuit;

b) sorting said vertices in said swap configuration circuit;

c) receiving a subsequent vertex in a control circuit coupled to said swap configuration circuit;

d) coupling a swapped vertex from said swap configuration circuit to an address output bus such that said swapped vertex corresponds to said subsequent vertex;

e) interfacing said swapped vertex with said address output bus in an output interface circuit.

16. The method of claim 15 further comprising the steps of:

receiving a swap base address in said control circuit;

determining a swap range using said swap base address;

determining whether said subsequent vertex is within said swap range;

coupling said swapped vertex to said address output bus when said subsequent vertex is within said swap range; and coupling said subsequent vertex to said address output bus when said subsequent vertex is not within said swap range.

17. The method of claim 15 further comprising the step of caching at least one vertex in said swap configuration circuit.

* * * * *